Jan. 23, 1962           A. J. WILEY           3,017,951
TRANSFER OF GASES INTO AND FROM LIQUID MEDIA
Filed July 31, 1958           3 Sheets-Sheet 1
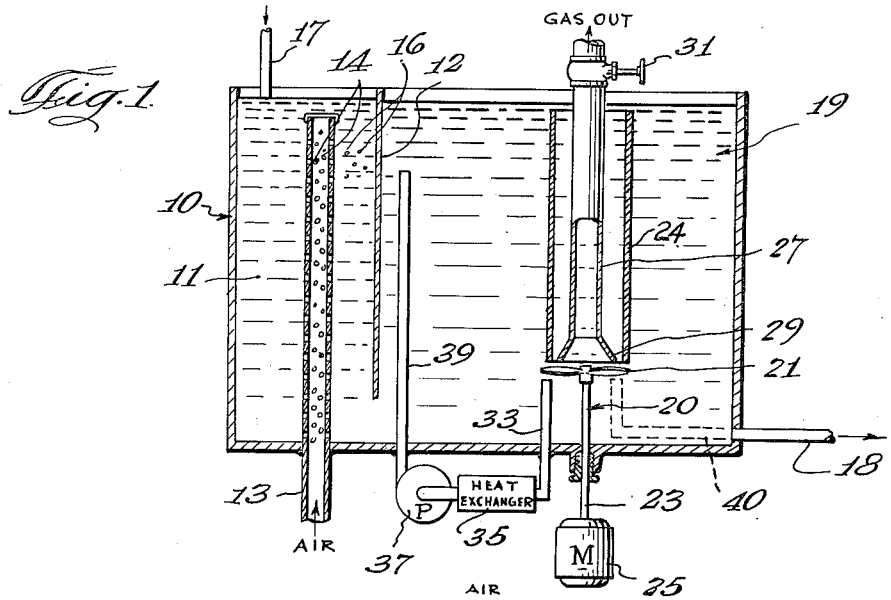
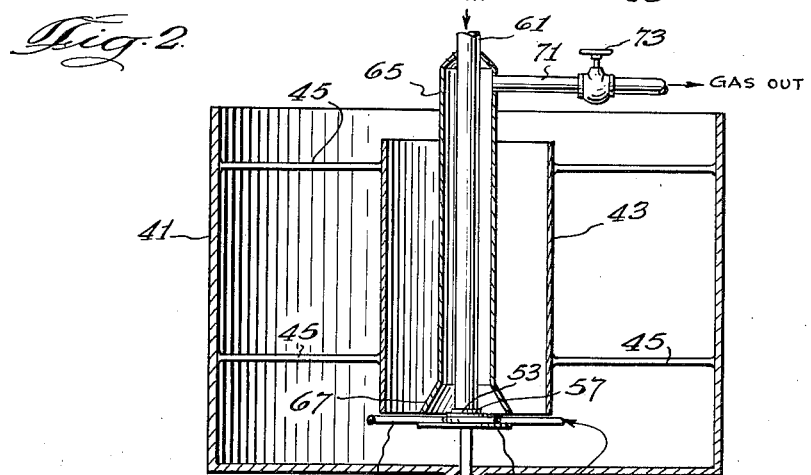
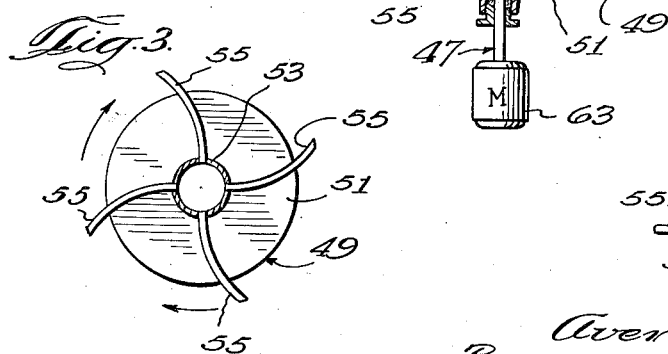
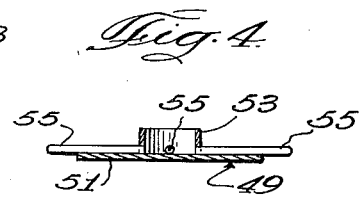

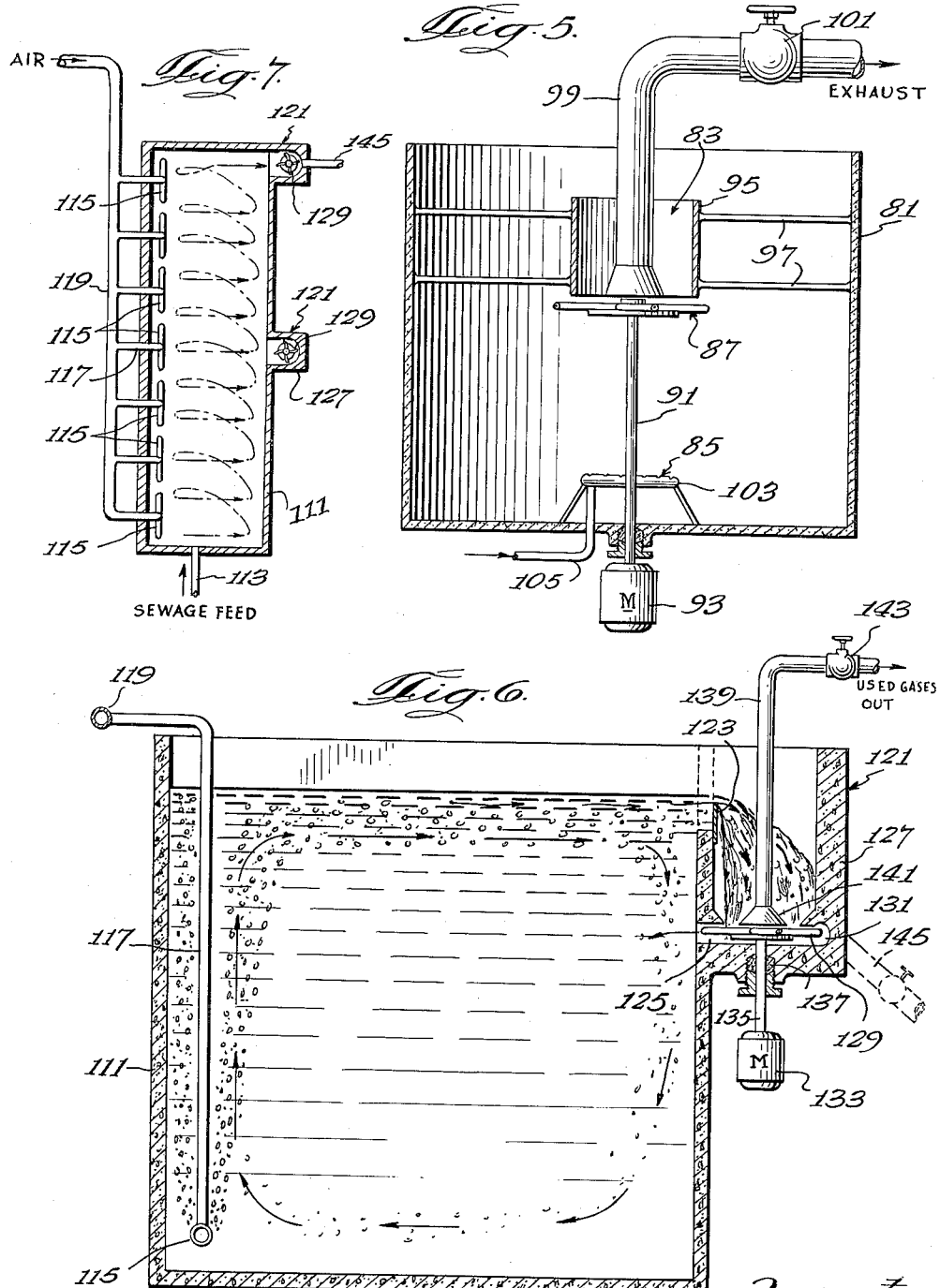

Jan. 23, 1962     A. J. WILEY     3,017,951
TRANSFER OF GASES INTO AND FROM LIQUID MEDIA
Filed July 31, 1958     3 Sheets-Sheet 3
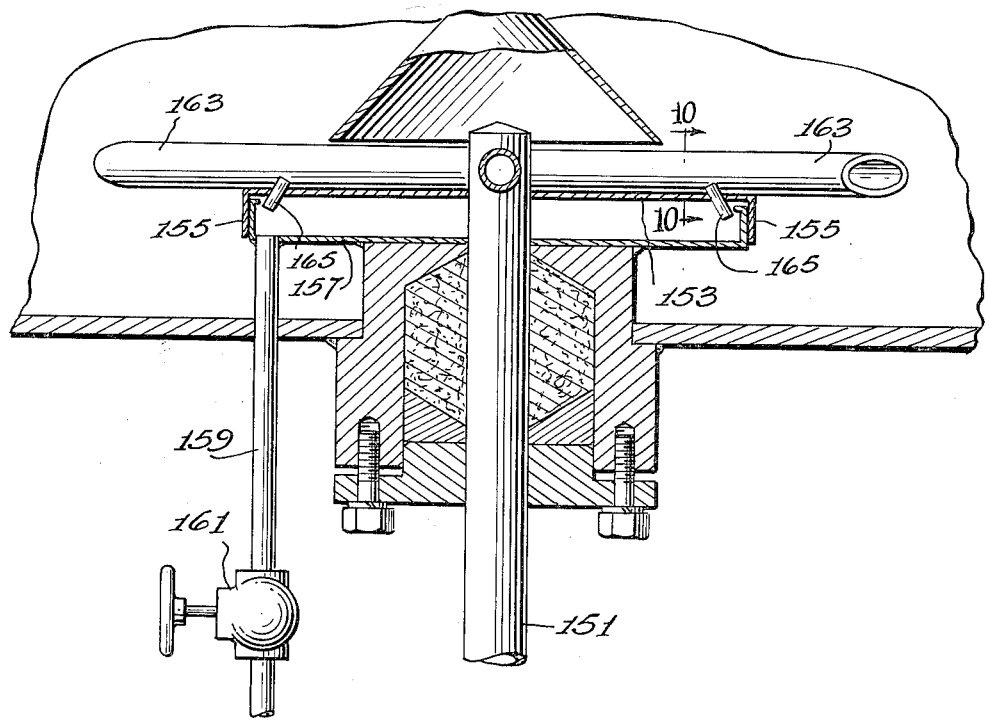
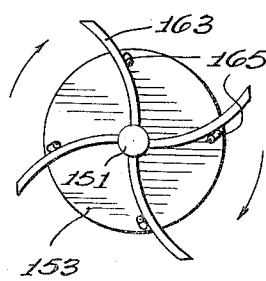
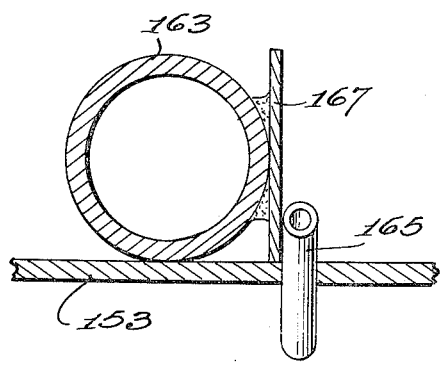
Inventor
Averill J. Wiley
By Soons, Glouster & Anderson
Attorneys

United States Patent Office 3,017,951
Patented Jan. 23, 1962

3,017,951
TRANSFER OF GASES INTO AND FROM LIQUID MEDIA
Averill J. Wiley, Appleton, Wis., assignor to Sulphite Products Corporation, Appleton, Wis., a corporation of Wisconsin
Filed July 31, 1958, Ser. No. 753,391
4 Claims. (Cl. 183—2.5)

The present invention is concerned with providing more efficient means for the transfer of gases into liquid media, maintenance of gases therein under controlled conditions, and removal of used gases from said liquid media.

The problem of transferring gases into and out of liquid media occurs in connection with many types of industrial processes such as various fermentation processes, for example, the processes of fermenting molasses, grain, and other carbohydrate materials; sewage treatment processes; and other biochemical, chemical, and physical treatments of liquids. The problem of transfer of gases into and out of liquid media is often most difficult in liquids which foam or form more or less stable emulsions with gases and, in this connection, such transfer of gases in the treatment of various fermentation substrates and certain types of sewage is quite difficult, due to the stability of the foam produced. As a consequence of such foam stability, inert and spent gases are trapped in the liquid so that the medium is quite difficult to handle in treating tanks, pumps, and conveying lines.

The foaming problem with accompanying volume build-up can be particularly troublesome, and has, in the past, required use of treating vessels having a volume substantially in excess of the gas-free liquid into which gases are introduced; or alternately has required the use of surface active agents with defoaming properties (see Industrial and Engineering Chemistry, vol. 42, page 1823) which agents may be quite expensive and which may have the additional disadvantage of introducing undesirable contamination of the liquid substrate under treatment.

Two dissimilar processes which exhibit this problem of volume build-up with apparent disadvantage are cited:

(1) In the alkaline kraft or sulfate process of pulping wood, a spent liquor containing dissolved lignin and other wood derivatives is obtained which is normally evaporated and burned for recovery of sodium and sulfur for reuse in the pulping process. Volatile sulfur compounds are lost to the extent of 20 to 25 pounds per ton of pulp production under existing methods of handling. It is known that these compounds may be subjected to an oxidizing step, wherein air or other sources of gaseous oxygen are blown into the liquid and maintained in the liquid in a finely divided state for a desired reaction time to convert the volatile sulfur compounds to non-volatile salts. However, when such treatment has been employed in the past, the spent liquor foamed excessively and tended to form large volumes of gas-liquid emulsion which necessitated much extra space and prolonged defoaming time during the course of such oxidation and for subsequent processing. This process is an example of direct chemical action with gases without involving biological fermentation or other microbiological action.

(2) A second process, but in the fermentation field, is the production of antibiotic agents, such as penicillin and streptomycin, wherein a carbohydrate substrate, usually also containing proteinaceous material, is subjected to microbiological transformations with the aid of vigorous aeration and agitation, and development of gas. Large amounts of foam and appreciable degrees of gas emulsification with accompanying build-up in volume may take place during the course of the fermentation and microbiological production of such antibiotics. The antibiotic industry has usually practiced control of the foaming and volume build-up by means of adding appropriate amounts of surface active defoaming agents. (See, for example, Industrial and Engineering Chemistry, vol. 42, page 1823.)

Still another gas transfer problem occurs in the sewage and industrial waste treatment field, wherein the aerobic microbiological treatment methods known as the activated sludge and the contact aeration processes are upon occasion subjected to excessive loadings of carbohydrates, proteins, and other fermentable material. When this occurs, foaming and gas entrapment in the suspended solids result in the phenomena commonly referred to as "rising sludge." The efficiency of treatment by these processes is greatly reduced when these reactions take place because of flooding or because of the need for material reduction in liquid volume throughout and/or of the volume and degree of air input required to prevent flooding. In such cases more efficient methods of introducing the desired amount of air or of gaseous oxygen, of treating with such gases, and finally of removing trapped gases are much to be desired.

In addition to the foregoing difficulties, the presence of the trapped gases in the media presents the additional problem of decreasing effective heat transfer and this may be quite serious. For example, the reactions occurring during biochemical fermentation with aerobic or anaerobic micro-organisms are primarily exothermic, and, unless some effective means are provided to remove the heat of reaction, the rate of reaction may be decreased or alternately various heat sensitive materials contained in the liquid may be damaged.

With the foregoing in mind, an object of the present invention is to provide means for more effectively transferring gases into liquid media, maintaining such gases in the liquid for the desired period of treatment, and removing said gases from the liquid. A more specific object of the invention is to provide a process for removing substantial amounts of spent gases from various liquid media so that the media may be treated and handled with minimum difficulty and maximum economy. Another object of the present inveniton is the provision of means for simultaneous aeration and degassing of liquid media, particularly liquid media having an oxygen demand. Still other objects and advantages of the invention will become apparent through reference to the following description.

The drawings illustrate apparatus for carrying out the principles of the invention, and in the drawings;

FIGURE 1 illustrates apparatus of the present invention, the apparatus being provided with an aerating section which permits introduction of air into the liquid prior to degassing;

FIGURE 2 illustrates a modified apparatus in which the aeration and the degassing of the liquid are performed in the same region;

FIGURE 3 is a plan view of the rotor employed in the apparatus of FIGURE 2;

FIGURE 4 is a view in elevation, and partially in cross-section of the rotor illustrated in FIGURE 3;

FIGURE 5 illustrates another apparatus of the invention, and in this apparatus gas is liberated from the media at a point away from the point of aeration of the media;

FIGURE 6 is a view, in cross-section, of still another apparatus of the invention wherein the media being treated is acted upon at a point outside of the reacting chamber;

FIGURE 7 is a plan view of the apparatus shown in FIGURE 6;

FIGURE 8 is also a plan view, the view illustrating a new type rotor;

FIGURE 9 is a cross-section view of the rotor shown in the previous figure; and

FIGURE 10 is a view taken along line 10—10 in FIGURE 9.

In the form of the invention shown in FIGURE 1, the media to be treated, which may be any liquid which presents foaming or gas emulsification problems, is introduced into a treating tank, indicated by reference numeral 10, which tank may be either cylindrical or polygonal in cross-section. The medium to be treated may be introduced into an aeration or gassing section 11 of the tank 10 which section is defined between the outer wall of the tank and a depending partition or baffle 12 secured at spaced points to the wall of the tank 10. The baffle extends vertically in the tank from a point adjacent the top of the tank to a point spaced from the bottom of the tank.

In the aeration section 11 of the tank, the medium may be treated with air or gas, the air or gas being introduced through a perforated pipe 13 which extends vertically into the tank 10. A source of gas under pressure (not shown) continuously introduces the gas under pressure into the section 11, resulting in the formation of numerous air or gas bubbles 16 which may be utilized by the medium.

The medium is introduced into the tank 10 through pipe 17 and is removed through pipe 18. As a result, the medium may be gasified in section 11 and then passed beneath the lower edge of the baffle 12 whereupon it rises into another section of the tank 10, referred to herein as the degassing section 19.

In the aeration or gassing section 11 and/or the degassing section, the media may be inoculated with suitable micro-organisms for carying out a fermentation reaction, or with aerobic bacteria where sewage is being treated.

In the degassing section 19, the liquid is agitated by means of an agitator 20 generally in one plane to form a vortex. The agitator 20 includes a plurality of vanes 21 which are carried on a vertically extending shaft 23. The vanes 21 extend outwardly from the shaft 23 and, while extending generally radially, the vanes have an arcuate contour. In cross-section the vanes may be generally circular, polygonal, or of irregular shape.

A draft tube 24 extends generally vertically upwardly from the agitator 21 and is in coacting relation with the agitator for most satisfactory operation. In this connection, the bottom edge of the draft tube is disposed close to the plane of movement of the vanes 21 on the agitator 20 and is within the periphery of the circle defined by the rotating vanes 21. The location of the bottom edge of the draft tube is important to achieve the desired results of the invention. In operation, the medium flows downwardly in the central portion of the tube, the medium flowing into the top of the tube and out of its bottom.

A motor 25 is located outside the tank 10 and drives the shaft 23 and the vanes 21 at a velocity sufficiently high to produce a vortex of liquid having a generally liquid-free gas space centrally of the vortex. I have found that gases are liberated as a result of the agitating action and draft tube location and may be collected centrally of the zone of agitation and discharged by means of a conduit 27 having an outwardly flared collecting head 29 disposed in close proximity to the plane of movement of the vanes 21 of the agitator 20. I have found that a positive pressure is developed in the conduit 27 and that the rate of discharge or exhaust of the gases may be controlled by use of a valve 31, which may be a gate valve.

Through control of valve 31 desired gas and liquid balances may be made within the system. In this connection, a balance between the liquid within the draft tube 24 and the liquid outside the draft tube may be controlled. Furthermore, by means of the valve, the density of the medium may be controlled and the valve may be employed to control the rate of degassing in the degassing section 19.

Through control of the density, it is possible to handle larger amounts of media in given volumes and, furthermore, more effective and efficient heat transfer is made possible. In the latter connection, efficient heat transfer may be important in connection with certain microbiochemical reactions which are exothermic in character. When gases are developed in the medium and it is desirable or necessary to effect heat transfer, the medium is desirably collected at a point of maximum density and cooled, as required. In FIGURE 1, such an arrangement is illustrated, the liquor being withdrawn through pipe 33 at a point adjacent the vanes 21 of the agitator 20 and conducted to a heat exchanger 35 which may be of the shell and tube type. The liquor leaving the heat exchanger is then returned to the degassing section 19 of the tank 10 by a pump 37 and pipe 39. While this arrangement is of advantage in many reactions, it may not be necessary in connection with certain processes, such as the treatment of sewage.

A new type rotor is illustrated in FIGURES 8, 9 and 10 for recovering deaerated liquor in another manner than that shown in FIGURE 1, and this rotor will be described in greater detail hereinafter.

Because of the difficulty in handling liquid containing gases in pumps, it may also be desirable to collect the treated media at a point of high density. Such an arrangement is also illustrated in FIGURE 1, wherein a discharge pipe 40 is shown in dotted lines, the pipe having a receiving opening disposed adjacent the vanes 21 of the agitator 20 and connecting to pipe 18.

Not only does the valve 31 provide the various control features previously described but it also may be adjusted to control the power requirements of the motor 25. In this connection, I have found that the power requirements decrease as the valve 31 is closed and increase as the valve 31 is opened.

The apparatus illustrated in FIGURE 1 is primarily designed for treatment of liquids which have a biochemical oxygen demand. However, it will be readily appreciated that the principles of the invention are equally applicable to the treatment of liquids which contain entrapped gas but which need not be aerated or gasified. In the latter case, the aerating means including the pipe 13 and the source of air can be entirely eliminated.

For some purposes, a more efficient apparatus for aerating and degassing liquids is shown in FIGURES 2 to 4, inclusive. In this apparatus the liquid material to be treated is delivered into a tank 41 which may be made of carbon steel clad with stainless steel. In the tank 41 an open ended draft tube 43 is supported centrally of the tank 41 by radially extending rods 45 which may be welded or otherwise attached to the walls of the tank 41. Agitation means 47 is disposed at the base of the draft tube 43 as shown. The draft tube 43 provides for better circulation of the media in the treating tank. During operation, the liquid being treated is circulated from the bottom of the draft tube 43, by the agitating means 47, upwardly into the annular space intermediate the draft tube 43 and the walls of the tank 41. At the top of the draft tube 43, the liquid cascades down into the tube for recirculation from the bottom of the tube.

In the form of the invention illustrated in FIGURE 2, the agitating means 47 includes a rotor 49 located adjacent the bottom of the draft tube 43, the rotor 49 being arranged to rotate in a plane generally perpendicular to the axis of the draft tube 43 and extending outwardly of the draft tube. In addition, the rotor is located in close proximity to the base of the draft tube 43. Thus, agitation is effected generally in one plane and the medium is subjected to radially increasing centrifugal force at the bottom of the draft tube.

As best seen in FIGURES 3 and 4, the rotor 49 includes a circular base plate 51 having an area greater than 25 percent of the area of the opening in the bottom of the draft tube 43. The plate 51 carries a central hub 53 from which a plurality of curved, hollow tubes 55 extend generally radially outwardly. The tubes 55 are supplied with air through a gland 57 for the purpose of aerating the medium, the gland communicating with the hub 53 and an air supply pipe 61 which is connected to a source of air. The outer ends of the tubes 55 extend beyond the periphery of the draft tube 43, as shown in FIGURE 2 so that there is a zone of aeration outside the draft tube.

The rotor 49 is driven by a motor 63 at a sufficiently high velocity to cause the formation of a liquid vortex and a generally liquid-free gas space centrally of the vortex, as in the apparatus shown in FIGURE 1. Disposed above the center of the rotor 49 is a gas outlet pipe 65 which is supported on and which is concentric with the air inlet pipe 61. The outlet pipe 65 also has an outwardly flared receiving head 67 for collecting gases immediately above the plane of agitation which is disposed closely adjacent the rotor 49.

The rotor 49, as in the case of the agitator 20 shown in FIGURE 1, pumps or circulates the medium from the bottom of the draft tube 43 and it causes the gases in the medium to be transferred out of the medium for collection by the receiving head 67.

A function of the rotor 49 is the aeration of the liquid. However, it should be noted that while the aerating means comprises an integral part of the rotor 49, separate air distributing means can be provided in addition to the rotor, as for example, through placement of a conventional sparger below the rotor. However, the rotor 49 is preferably not only a gas separating means and pump, but also the aerating means for the liquid.

As previously indicated, the air inlet pipe 61 and the outlet pipe 65 are concentric so that as the air entering the pipe 61 flows downwardly, it is in countercurrent heat exchange relationship with the gases being liberated upwardly through the pipe 65. This feature provides for cooling of the gases being liberated, as well as for preheating of the air. The gases rising in the pipe 65 are vented to a suitable discharge point by means of a pipe 71, the control of the gas flow being regulated by a valve 73.

The relative size of the receiving head 67 formed on the pipe 65 is an important feature of the invention. The largest dimension of the head should not be large enough to cause swamping of the draft tube 43 but should be large enough to collect the saparated gases efficiently. From experience I have found that the operation is most efficient when the area of the head 67 is between about 30 percent and 70 percent of the area of the bottom of the draft tube 43.

As in the case of the apparatus shown in FIGURE 1, the provision of the degassing tube 65 makes possible most efficient transfer of gases from media, greater amounts of such transfer being effected when the degassing tube 65 is vented directly into the atmosphere than when a pressure is maintained in the tube 65. When the valve 73 is closed, a back pressure builds up in the degassing tube causing the liquid to fill up the draft tube 43 so that the total head against which the rotor 49 works is decreased and, as a result, the power requirements of the motor are lessened. Through control of the valve 73, the amount of gas separated from the liquid may be controlled, and the valve may be adjusted so as to vent off gases at the same rate that air is being introduced. Thus, as the air input is increased, the exhaust may also be increased, thereby maintaining the density of the liquid as well as the power requirements substantially constant.

The valve 73 may be also adjusted to vent off more gas than is being introduced by the air inlet, thereby increasing the density of the liquid. However, the extent of density increase is controlled by several factors including the centrifugal force exerted by the rotor 49 and the rate of flow of liquid through the draft tube 43.

The apparatus shown in FIGURE 2 may be operated intermittently or continuously, though the apparatus shown is adapted for intermittent operation. In continuous operation, suitable supply and discharge pipes should be provided along with means for supplying nutrients or other materials as required.

A third embodiment of the invention is shown in FIGURE 5 of the drawings. As shown in this figure, the apparatus includes a tank 81, as in the previous embodiments, degassing means 83, and gassing or aerating means 85 at a point spaced from the degassing means 83. The degassing means 83 includes a rotor 87 adapted to form a vortex, the rotor in the illustrated embodiment being similar to that shown in FIGURES 3 and 4. The rotor is carried on a shaft 91 which is driven by a motor 93.

The rotor 87 is disposed at the base of a short draft tube 95 which is supported centrally of the tank 81 by rods 97 which connect to the walls of the tank. The top of the draft tube is disposed below but adjacent the top of the tank. The relative position of the bottom of the draft tube to the rotor is in accord with the previous examples, as shown in FIGURE 5.

As in the previous embodiments of the invention, a degassing tube 99 is in close proximity to the rotor 87, the tube collecting gases separated from the medium and conducting them away from the medium. In the tube 99 is disposed a valve 101 for controlling transfer of gas out of the medium to effect the desired results previously described.

The gassing means 85 may comprise a conventional sparge 103 which connects to a pipe 105, the pipe being connected to a source of air (not shown). The sparge 103 is preferably disposed adjacent the bottom of the tank 81 to provide more effective gassing or aeration.

Still another embodiment of the invention is shown in FIGURES 6 and 7, these figures illustrating apparatus which is particularly adapted for handling sewage in a conventional sewage plant. As shown in the drawings, this embodiment of the invention comprises an elongated tank 111, which may be fabricated from concrete. The sewage enters the tank through a feed pipe 113 and is treated in its travel through the tank with air which is introduced adjacent the bottom of the tank by means of series of spargers 115, the spargers being supplied through pipes 117 from a manifold 119 which connects to a source of air or gas (not shown).

At one or more points along the side of the tank are disposed deaeration units 121 which communicate with the tank 111. Foam and/or medium is admitted to the deaeration unit over a vertically adjustable dam plate 123 and is returned to the tank through a port 125 located adjacent the bottom of the deaerating unit and below the normal surface of medium in the tank 111.

The deaerating unit 121 comprises a casing 127 which is supported on the side of the tank 111, and a rotor 129 which may be of the type shown in FIGURES 2, 3 and 4 of the drawings or FIGURES 8, 9 and 10, to be later described. The rotor 129 is located at the base of the casing 127 which flanges inwardly immediately above the rotor, and is contained in a circular compartment 131. The rotor is driven by a motor 133 through a shaft 135 which extends through a gland 137. The deaerating unit 121 further comprises a deaerating tube 139 which extends vertically in the casing 127 and terminates at its lower end in a collecting head 141 disposed closely adjacent the rotor 129. The tube 139 may be adjustably closed by means of a control valve 143. The location of the rotor 129 to the bottom of the casing 127 and to the deaerating tube 139 is the same as the relation of the rotor to the draft tubes shown in FIGURES 1, 2 and 5 of the drawings as previously described.

If desired, the medium may be removed from the tank 111 in deaerated condition through provision of a pipe 145 (shown dotted in FIGURE 6) which communicates with the rotor containing compartment 131. The effluent, if sewage is being treated, may then be conducted to a settling basin.

The apparatus shown in FIGURES 6 and 7 and above described has many advantages, but is particularly advantageous when the phenomenon, previously referred to, "rising sludge" occurs. When such phenomenon occurs, there is excessive volume build-up, which build-up can be easily accommodated with the above described apparatus without reducing flow or substantially varying operating procedures.

As before indicated, it is often desirable to remove a treated medium, which is subject to foaming or gas emulsification, substantially free from gas. Possible arrangements have been shown and described in connection with the apparatus shown in FIGURE 1 and FIGURES 6 and 7. However, FIGURES 8, 9 and 10 illustrate a simple and effective apparatus for removing liquids substantially free from gases. This apparatus comprises a shaft 151 on which is carried a circular plate 153 having a downwardly extending skirt 155 which is in close proximity to the edge of a collecting pan 157 so as to prevent the medium, during treating, from entering the pan between it and the skirt. The pan 157 communicates with a discharge pipe 159 which may be closed off by a valve 161.

Also mounted upon the shaft 151 are a plurality of radially extending, arcuate blades 163, the blades and circular plate 153 comprising a rotor which rotates with the shaft 151. The blades 163 curve away from the direction of rotation of the rotor and have a circular cross section. Collecting tubes 165 are disposed at the leading edge (relative to the direction of rotation) of the blades 163 and communicate with the pan 157 through the plate 153. The tubes are preferably located at the outer edge of the plate 153. As shown, the blades 163 extend outwardly of the plate 153.

In no case does the collecting tube extend above the blade 163 but the tubes extend angularly, relative to plate 153, toward the center of the rotor so as to more effectively collect the medium.

In some instances, the forward edge of the blades 163 may be provided with a directing baffle 167, as shown only in FIGURE 10, to direct the medium into the collecting tube.

This rotor is adapted for highly effective recovery of degassed liquids when used in combination with the draft tubes and degassing tubes previously described. This new type rotor may be effectively used in any of the previously described apparatus in place of the rotors there described.

As previously pointed out, the invention is adapted for many industrial processes and the following specific examples illustrate the results achieved in applying the process and apparatus of the present invention to various materials.

A substrate of beet molasses having a specific gravity of 1.081 at 70° F. was introduced into apparatus of the type illustrated in FIGURE 2, 13 liters being introduced. The tank 41 was 14⅛ inches in diameter and the draft tube 43 was 6 inches in diameter. The rotor, which was 7 inches in diameter, was driven at 2150 r.p.m. and the receiving head 67 was 3¼ inches in diameter. The volume of substrate built up to 230 percent of the original volume. When the valve 73 was closed so that there was no deaeration, the gas transfer rate was 2.25 cubic feet per minute. Using the same substrate, but with deaeration, the gas transfer rate was 4.8 cubic feet per minute, or an increase of about 210 percent.

A substrate of cane molasses was also employed, in the above apparatus, this substrate having a specific gravity of 1.19 at 70° F. Fifteen liters was used and, in the apparatus, the volume increased 210 percent. Without employing the deaeration tube 65, the gas transfer rate was 1.8 cubic feet per minute but when the tube was used, the rate of transfer increased more than three times to 6.4 cubic feet per minute.

Even better results were achieved in the apparatus through the use of wood sugar molasses when 14.8 liters were used, the specific gravity being 1.061 at 83° F. The volume increased 225 percent but the gas transfer rate was increased 800 percent through use of the deaeration tube 43. Specifically, the gas transfer rate when the tube was not used, was .5 cubic feet per minute while, when the tube was employed, the gas transfer rate was increased to 4.0 cubic feet per minute.

Kraft liquor containing 17.5 percent solids was likewise introduced into the apparatus and the gas transfer rate increased twelve times through the use of the deaeration tube. Ten liters were used, the volume building up 400 percent. The gas transfer rate without the deaeration tube was .5 cubic feet per minute but when the tube was used, the rate increased to 6.0 cubic feet per minute.

While the above examples illustrate the application of the invention to a few liquid media, it will be understood that the principles of the invention may be used in connection with other biochemical, chemical and physical processes which present similar problems of controlled gas transfer into and from liquids. Beside fermentation processes, the invention is applicable to treatment of sewage with aerobic bacteria and in the biochemical, chemical, and/or physical treatment of liquids wherein gases are introduced, mixed, or reacted with and removed from liquid substrates under controlled conditions. The invention is equally applicable to anaerobic processes which employ gases other than air or oxygen and in which the problems of gas entrapment or of gas reaction are present.

This application is a continuation-in-part of my preceding application, Serial No. 332,853, filed January 23, 1953, entitled "Transfer of Gases Into and From Liquid Media," now abandoned.

It will be evident that various modifications can be made in the process and apparatus described without departing from the scope of the present invention.

I claim:

1. A process for injecting gases at a controlled rate into a liquid system to promote desired reactions in the system and for simultaneously removing, at a controlled rate, from the system undesired, undissolved gases resulting from reactions within the system, said process including the steps of establishing a zone of agitation generally in one plane, said agitation establishing in said plane a zone of radially increasing centrifugal force in the liquid system, establishing a generally vertical zone, extending from said plane adjacent the periphery of said zone of agitation, the outer boundary of said generally vertical zone being inwardly of said periphery and in close proximity thereto, and flowing liquid downwardly through said generally vertical zone, which zone is in coacting relation with said zone of agitation to cause undissolved gases in said system to move to the central region of said zone of agitation centrally of said generally vertical zone, collecting said gases immediately above said zone of agitation in said central region and conducting said collected gases from said central region upwardly through a degassing zone disposed medial of said generally vertical zone out of said system and out of contact with the liquid, controlling the rate of removal of said gases from said central region to maintain a desired balance within said system and simultaneously injecting gases into the liquid system outside said central region and outside said vertical zone.

2. A process for injecting gases at a controlled rate into a liquid system to promote desired reactions in the system and for simultaneously removing, at a controlled rate, from the system undesired, undissolved gases resulting from reactions within the system, said process including the steps of establishing a zone of agitation generally in one plane, said agitation establishing in said plane a zone of radially increasing centrifugal force in the liquid system, establishing a generally vertical zone extending upwardly from said plane adjacent the periphery of said zone of agitation, the outer boundary of said generally vertical zone being inwardly of said periphery and in close proximity thereto, and flowing liquid downwardly through said generally vertical zone, which zone is in coacting relation with said zone of agitation to cause undissolved gases in said system to move to the central region of said zone of agitation centrally of said generally vertical zone, collecting said gases immediately above said zone of agitation in said central region and conducting said collected gases from said central region upwardly through a degassing zone disposed medial of said generally vertical zone out of said system out of contact with the liquid, controlling the rate of removal of said gases from said central region under positive pressure to maintain a desired gaseous balance within said system, and simultanely injecting gases into the liquid system outside said central region and adjacent but outside said vertical zone.

3. A process for injecting gases at a controlled rate into a liquid system to promote desired reactions in the system and for simultaneously removing, at a controlled rate, from the system undesired, undissolved gases resulting from reactions within the system, said process including the steps of establishing a zone of agitation and aeration generally in one plane, said agitation establishing in said plane a zone of radially increasing centrifugal force in the liquid system, said aeration being effected at the periphery of said zone of increasing centrifugal force, establishing a generally vertical zone extending upwardly from said plane adjacent the periphery of said zone of agitation, the outer boundary of said generally vertical zone being inwardly of said periphery and in close proximity thereto, and flowing liquid downwardly through said generally vertical zone, which zone is in coacting relation with said zone of agitation to cause undissolved gases in said system to move to the central region of said zone of agitation centrally of said generally vertical zone, simultaneously with said aeration collecting said gases immediately above said zone of agitation in said central region and conducting said collected gases from said central region upwardly through a degassing zone disposed medial of said generally vertical zone out of said system and out of contact with the liquid, and controlling the rate of removal of said gases from said central region to maintain a desired balance within said system.

4. A process for injecting gases at a controlled rate into a liquid system to promote desired reactions in the system and for simultaneously removing, at a controlled rate, from the system undesired, undissolved gases resulting from reactions within the system, said process including the steps of establishing a zone of agitation and aeration generally in one plane, said agitation establishing in said plane a zone of radially increasing centrifugal force in the liquid system, said aeration being effected at the periphery of said zone of increasing centrifugal force, establishing a generally vertical zone extending upwardly from said plane adjacent the periphery of said zone of agitation and in close proximity thereto, and flowing liquid downwardly through said generally vertical zone, which zone is in coacting relation with said zone of agitation to cause undissolved gases in said system to move to the central region of said zone of agitation centrally of said generally vertical zone, simultaneously with said aeration collecting said gases immediately above said zone of agitation in said central region and conducting said collected gases from said central region upwardly through a degassing zone disposed medial of said generally vertical zone out of said system out of contact with the liquid, controlling the rate of removal of said gases from said central region to maintain a desired balance within said system, and conducting said gases for aeration and said collected gases in heat exchange relation.

References Cited in the file of this patent

UNITED STATES PATENTS

| | | |
|---|---|---|
| 2,254,600 | Ditto | Sept. 2, 1941 |
| 2,463,251 | Curtis | Mar. 1, 1949 |
| 2,603,305 | Hachmuth | July 15, 1952 |
| 2,678,913 | Kalinske | May 18, 1954 |
| 2,753,010 | Walther | July 3, 1956 |

FOREIGN PATENTS

| | | |
|---|---|---|
| 209,439 | Great Britain | Jan. 7, 1924 |